United States Patent
Weinstein et al.

(10) Patent No.: US 9,851,239 B2
(45) Date of Patent: Dec. 26, 2017

(54) SYSTEM AND METHOD FOR PREVENTING FALSE FLOW MEASUREMENTS IN A VIBRATING METER

(75) Inventors: Joel Weinstein, Boulder, CO (US); Aart R Pruysen, Ede (NL); Steven M Jones, Erie, CO (US); John Ansdell Houghton, Holmfirth (GB)

(73) Assignee: Micro Motion, Inc., Boulder, CO (US)

( * ) Notice: Subject to any disclaimer, the term of this patent is extended or adjusted under 35 U.S.C. 154(b) by 542 days.

(21) Appl. No.: 14/116,472

(22) PCT Filed: Apr. 27, 2012

(86) PCT No.: PCT/US2012/035587
§ 371 (c)(1),
(2), (4) Date: Nov. 8, 2013

(87) PCT Pub. No.: WO2012/161922
PCT Pub. Date: Nov. 29, 2012

(65) Prior Publication Data
US 2014/0116107 A1    May 1, 2014

Related U.S. Application Data

(60) Provisional application No. 61/488,944, filed on May 23, 2011.

(51) Int. Cl.
*G01F 25/00* (2006.01)
*G01F 1/00* (2006.01)
(Continued)

(52) U.S. Cl.
CPC .......... *G01F 25/0007* (2013.01); *G01F 1/002* (2013.01); *G01F 1/05* (2013.01);
(Continued)

(58) Field of Classification Search
CPC .... G01F 25/0007; G01F 25/00; G01F 1/8436; G01F 1/50
(Continued)

(56) References Cited

U.S. PATENT DOCUMENTS

| 4,358,947 A * | 11/1982 | Greene ............... G01F 25/0007 73/1.31 |
| RE32,157 E * | 5/1986 | Waugh ............... G01F 25/0015 73/1.17 |

(Continued)

FOREIGN PATENT DOCUMENTS

| DE | 102005005295 A2 | 6/2006 |
| JP | 2003-26296 A | 1/2003 |
| JP | 2004361190 A | 12/2004 |

*Primary Examiner* — Helen Kwok
*Assistant Examiner* — Nashimiya Fayyaz
(74) *Attorney, Agent, or Firm* — The Ollila Law Group LLC (57) ABSTRACT

A meter electronics (20) for a vibrating meter (5) is provided. The vibrating meter (5) includes a sensor assembly located within a pipeline (301). The sensor assembly (10) is in fluid communication with one or more fluid switches (309). The meter electronics (20) is configured to measure one or more flow characteristics of a fluid flowing through the sensor assembly (10). The meter electronics (20) is further configured to receive a first fluid switch signal (214) indicating a fluid condition within the pipeline (301) from a first fluid switch (309) of the one or more fluid switches. The meter electronics (20) is further configured to correct the one or more flow characteristics if the fluid condition is outside a threshold value or band.

16 Claims, 4 Drawing Sheets

(51) Int. Cl.
    *G01F 1/84* (2006.01)
    *G01F 15/075* (2006.01)
    *G01F 1/05* (2006.01)

(52) U.S. Cl.
    CPC .......... *G01F 1/8436* (2013.01); *G01F 1/8477* (2013.01); *G01F 15/0755* (2013.01)

(58) Field of Classification Search
    USPC .................. 73/1.16, 1.34, 861.02, 1.31, 1.35
    See application file for complete search history.

(56) References Cited

U.S. PATENT DOCUMENTS

| | | | | |
|---|---|---|---|---|
| 4,829,808 | A | * | 5/1989 | West .................. G01F 25/0015 73/1.17 |
| 4,911,006 | A | | 3/1990 | Hargarten et al. |
| 4,987,914 | A | * | 1/1991 | Adney .................. G01F 1/007 137/486 |
| 6,327,915 | B1 | * | 12/2001 | Van Cleve ............ G01F 1/8409 73/861.357 |
| 6,360,579 | B1 | * | 3/2002 | De Boom ............. G01F 25/003 73/1.35 |
| 2005/0022611 | A1 | | 2/2005 | Hemp et al. |
| 2006/0096388 | A1 | * | 5/2006 | Gysling .................. G01F 1/666 73/861.03 |
| 2009/0014366 | A1 | * | 1/2009 | Takeda .................. B01D 61/18 210/87 |
| 2010/0134304 | A1 | | 6/2010 | Weinstein et al. |

* cited by examiner

SYSTEM AND METHOD FOR PREVENTING FALSE FLOW MEASUREMENTS IN A VIBRATING METER

CROSS-REFERENCE TO RELATED APPLICATIONS

This is a National Stage entry of International Application No, PCT/US2012/035587, with an international filing date of Apr. 27, 2012 which claims priority of United States provisional patent application No. 61/488,944, flied May 23, 2011, entitled "SYSTEM AND METHOD FOR PREVENTING FALSE FLOW MEASUREMENTS IN A VIBRATING METER".

TECHNICAL FIELD

The embodiments described below relate to, vibrating meters, and more particularly, to a system and method for preventing false flow measurements in a vibrating meter.

BACKGROUND OF THE INVENTION

Vibrating meters, such as for example, vibrating densitometers and Coriolis flow meters are generally known and are used to measure mass flow and other information for materials within a conduit. The meter comprises a sensor assembly and an electronics portion. The material within the sensor assembly may be flowing or stationary. Each type of sensor may have unique characteristics, which a meter must account for in order to achieve optimum performance.

Exemplary Coriolis flow meters are disclosed in U.S. Pat. No. 4,109,524, U.S. Pat. No. 4,491,025, and Re. 31,450 all to J. E. Smith et al. These flow meters have one or more conduits of straight or curved configuration. Each conduit configuration in a Coriolis mass flow meter has a set of natural vibration modes, which may be of simple bending, torsional, or coupled type. Each conduit can be driven to oscillate at a preferred mode.

Material flows into the flow meter sensor assembly from a connected pipeline on the inlet side of the sensor, is directed through the conduit(s), and exits the sensor through the outlet side of the sensor. The natural vibration modes of the vibrating material filled system are defined in part by the combined mass of the conduits and the material flowing within the conduits.

When there is no flow through the sensor assembly, a driving force applied to the conduit(s) causes all points along the conduit(s) to oscillate with identical phase or small "zero offset," which is a time delay measured at zero flow. As material begins to flow through the sensor assembly, Coriolis forces cause each point along the conduit(s) to have a different phase. For example, the phase at the inlet end of the sensor lags the phase at the centralized driver position, while the phase at the outlet leads the phase at the centralized driver position. Pick-off sensors on the conduit(s) produce sinusoidal signals representative of the motion of the conduit(s). Signals output from the pick-off sensors are processed to determine the phase difference between the pick-off sensors. The phase difference between the two or more pick-off sensors is proportional to the mass flow rate of material flowing through the conduit(s).

The mass flow rate of the material can be determined by multiplying the phase difference by a Flow Calibration Factor (FCF). Prior to installation of the sensor assembly of the flow meter into a pipeline, the FCF is determined by a calibration process. In the calibration process, a fluid is passed through the flow tube at a known flow rate and the relationship between the phase difference and the flow rate is calculated (i.e., the FCF). The sensor assembly of the flow meter subsequently determines a flow rate by multiplying the FCF by the phase difference of the pick-off sensors. In addition, other calibration factors can be taken into account in determining the flow rate.

Due, in part, to the high accuracy of vibrating meters, and Coriolis flow meters in particular, vibrating meters have seen success in a wide variety of industries. One industry that has faced increased demands for accuracy and repeatability in measurements is the oil and gas industry. With the increasing costs associated with oil and gas, custody transfer situations have demanded improvements in measuring the quantity of oil that is actually transferred. An example of a custody transfer situation is fuel bunkering. Bunkering refers to the practice of storing and transferring marine fuel oils, which have come to be known as bunker fuels. For ship fueling, large amounts of fuel may be temporarily stored in a barge or other container for the purpose of transferring fuel from shore to a ship. A bunker may be located on a dock or other port facility, or may be carried by a barge or other refueling vehicle. During bunkering, the fuel measurement usually comprises an empty-full-empty batching process, thereby allowing gas to become entrained in the fuel. The entrained gas in the fuel produces serious measurement difficulties as both the volume and the mass of the fuel being delivered changes. Additionally, at the beginning and the end of the process, the flow meter may be partially filled with fluid rather than completely empty or completely full.

Bunker fuel comprises a relatively heavy petroleum derivative that is used in heating or in large industrial and/or marine engines. There are multiple grades of fuel that may comprise a bunker fuel. Bunker fuel is generally heavier and more viscous than gasoline or diesel.

Marine fuel costs represent a major portion of a ship's operating cost. With increasing oil prices and increasing conservation efforts, careful fuel management has become vital for environmental and financial reasons.

Improvements in Coriolis flow meters have made it possible to obtain more accurate measurements of fuel even with entrained gas. A problem can exist however, whenever flow is stopped, for example at the beginning or at the end of the bunkering process when the valves and pumps delivering the fuel are closed. One reason is due to a change in the zero offset of the vibrating meter. Even after fuel has stopped flowing through the Coriolis flow meter, the flow tubes continue to vibrate. Ideally, the time delay between the pick-off sensors would return to the original zero offset value when the flow through the tubes is zero. As long as the time delay returns to the original zero offset, the Coriolis flow meter will report a zero mass flow. However, various factors attribute to the zero offset of the sensor assembly and some of the factors may change either during the bunkering process or after the last zeroing process.

For example, while many Coriolis flow meters are capable of maintaining accurate measurements despite entrained gas, in some situations when the flow through the flow tubes falls to zero, the entrained gas can lead to an imbalance that creates asymmetric damping between the inlet and the outlet side of the vibrating meter's sensor assembly. The asymmetric damping can cause a time delay between pick-offs, which may be different than the original zero offset and thus may be interpreted as real flow. This problem may also be experienced if the sensor assembly is only partially filled with fluid, for example. Even in vibrating meters that are tolerant of fuel including entrained gas, it may be desirable in some situations to cease measuring flow through the Coriolis flow meter after the valves and pumps have been closed or shut off. This is because the fuel within the pipeline that continues to flow downstream of the fluid control valve due to residual pressure or gravity, for example, may have been in the system already. Thus, fuel previously within the system should not be counted towards the bunkering total. Often coordinating the totalizer of the flow meter with the closing of the valves and pumps is difficult because the flow meter may not be in communication with the valves or the pump.

Various prior art methods have been proposed to deal with the false readings associated with aerated fluid within the flow tubes at zero flow. One of the most frequently used methods is to simply read the totalizer value immediately after turning off the pump and/or closing the valve. The idea behind this method is to obtain a reading before the vibrating meter is able to output false measurements. However, this approach relies upon operator intervention to closely monitor the situation. This approach also assumes that the operator reading the totalized value wants the meter to measure a proper batch total.

Another method is to increase the low flow cutoff of the vibrating meter. The low flow cutoff is a value that assumes time delays below the low flow cutoff are due to the zero offset and thus, equal zero flow. A problem with this method is that as the low flow cutoff value increases, there is an increased potential of real flow values being below the low flow cutoff. Therefore, this approach can result in real flow values being forced to zero.

Yet another prior art approach is to set high and low density limits so that totalizing is prevented if the density deviates from the known liquid density by more than a threshold amount. Unfortunately, this method does not work well in practice because the presence of entrained gas and solid particulates can cause positive and negative errors, which often cancel out. Additionally, in bunkering applications, considerable mass flow can actually occur when the measured density is below the known liquid density, for example, if there is 5% gas volume fraction during a portion of the batch delivery.

Consequently, these prior art approaches are inadequate in most situations. Therefore, there is a need in the art to provide an increased reliability and accuracy for vibrating meters. There is a need in the art to accurately determine when a vibrating meter should stop totalizing flow measurements. These and other problems are solved and an advance in the art is achieved.

The embodiments described below provide a system and method that substantially prevents false measurements in a vibrating meter. The embodiments described below provide one or more fluid switches proximate the vibrating meter. The fluid switches can detect certain flow conditions, such as the presence of fluid and/or fluid flow proximate the vibrating meter in order to determine if the vibrating meter should be totalizing measurements.

SUMMARY OF THE INVENTION

A fluid flow system is provided according to an embodiment. The fluid flow system comprises a pipeline and a first fluid switch located within the pipeline and determining one or more fluid conditions within the pipeline. According to an embodiment, the fluid flow system further comprises a vibrating meter including a sensor assembly located within the pipeline proximate to and in fluid communication with the first fluid switch and a meter electronics in electrical communication with the sensor assembly to receive one or more sensor signals to measure one or more flow characteristics. According to an embodiment, the fluid flow system further comprises a system controller in electrical communication with the first fluid switch and in electrical communication with the meter electronics. The system controller is configured to receive the one or more measured flow characteristics from the meter electronics and receive a first fluid switch signal indicating the one or more fluid conditions within the pipeline from the first fluid switch. The system controller is further configured to correct the measured flow characteristics if a fluid condition of the one or more fluid conditions is outside a threshold value or band.

A method for operating a vibrating meter is provided according to an embodiment. The vibrating meter includes a meter electronics and a sensor assembly located within a pipeline and in fluid communication with one or more fluid switches. According to an embodiment, the method comprises a step of measuring one or more flow characteristics of a fluid flowing through the sensor assembly. According to an embodiment, the method further comprises a step of measuring one or more fluid conditions with the one or more fluid switches. According to an embodiment, the method corrects the one or more flow characteristics of the fluid flowing through the sensor assembly if a fluid condition of the one or more fluid conditions is outside a threshold value or band.

A meter electronics for a vibrating meter is provided according to an embodiment. The meter electronics comprises a sensor assembly located within a pipeline and in fluid communication with one or more fluid switches. According to an embodiment, the meter electronics is configured to measure one or more flow characteristics of a fluid flowing through the sensor assembly. According to an embodiment, the meter electronics is further configured to receive a first fluid switch signal indicating a fluid condition within the pipeline from a first fluid switch of the one or more fluid switches. According to an embodiment, the meter electronics is further configured to correct the one or more flow characteristics if the fluid condition is outside a threshold value or band.

Aspects

According to an aspect, a fluid flow system comprises:
a pipeline;
a first fluid switch located within the pipeline and determining one or more fluid conditions within the pipeline;
a vibrating meter including:
  a sensor assembly located within the pipeline proximate to and in fluid communication with the first fluid switch;
  a meter electronics in electrical communication with the sensor assembly to receive one or more sensor signals to measure one or more flow characteristics;
a system controller in electrical communication with the first fluid switch and in electrical communication with the meter electronics and configured to:
  receive the one or more measured flow characteristics from the meter electronics;
  receive a first fluid switch signal indicating the one or more fluid conditions within the pipeline from the first fluid switch; and
  correct the measured flow characteristics if a fluid condition of the one or more fluid conditions is outside a threshold value or band.

Preferably, the first fluid switch is located upstream from the sensor assembly.

Preferably, the fluid flow system further comprises at least a second fluid switch located proximate to and downstream from the sensor assembly.

Preferably, the first fluid switch comprises a fluid level switch and wherein the first fluid switch signal indicates that a fluid level within the pipeline is outside a threshold value or band.

Preferably, the first fluid switch comprises a fluid flow switch and wherein the first fluid switch signal indicates that a fluid flow rate through the pipeline is outside a threshold value or band.

Preferably, the vibrating meter comprises a Coriolis mass flow meter and a flow characteristic of the one or more flow characteristics comprises a mass flow rate.

Preferably, the correction of the measured flow characteristics comprises determining the flow characteristics are false.

According to another aspect, a method for operating a vibrating meter including a meter electronics and a sensor assembly located within a pipeline and in fluid communication with one or more fluid switches comprises steps of:
  measuring one or more flow characteristics of a fluid flowing through the sensor assembly;
  measuring one or more fluid conditions with the one or more fluid switches; and
  correct the one or more flow characteristics of the fluid flowing through the sensor assembly if a fluid condition of the one or more fluid conditions is outside a threshold value or band.

Preferably, a fluid switch of the one or more fluid switches comprises a fluid level switch.

Preferably, a fluid condition of the one or more fluid conditions comprises a fluid level within the pipeline.

Preferably, a fluid switch of the one or more fluid switches comprises a fluid flow switch.

Preferably, a fluid condition of the one or more fluid conditions comprises a flow rate within the pipeline.

Preferably, the method further comprises a step of totalizing the one or more flow characteristics after a fluid condition of the one or more fluid conditions falls outside the threshold value or band.

Preferably, the vibrating meter comprises a Coriolis flow meter.

Preferably, a flow characteristic of the one or more flow characteristics comprises a mass flow rate.

According to another aspect, a meter electronics for a vibrating meter with a sensor assembly located within a pipeline and in fluid communication with one or more fluid switches is configured to:
  measure one or more flow characteristics of a fluid flowing through the sensor assembly;
  receive a first fluid switch signal indicating a fluid condition within the pipeline from a first fluid switch of the one or more fluid switches; and
  correct the one or more flow characteristics if the fluid condition is outside a threshold value or band.

Preferably, the fluid condition comprises a fluid level within the pipeline.

Preferably, the fluid condition comprises a flow rate within the pipeline.

Preferably, the meter electronics is further configured to totalize the one or more flow characteristics after the one or more fluid conditions falls outside the threshold value or band.

Preferably, the first fluid switch is located upstream of the sensor assembly and wherein the meter electronics is further configured to receive a second fluid switch signal from a second fluid switch located downstream of the sensor assembly.

DETAILED DESCRIPTION OF THE INVENTION

FIGS. 1-4 and the following description depict specific examples to teach those skilled in the art how to make and use the best mode of embodiments of a prevention system. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the prevention system. As a result, the embodiments described below are not limited to the specific examples described below, but only by the claims and their equivalents.

Figure 1:
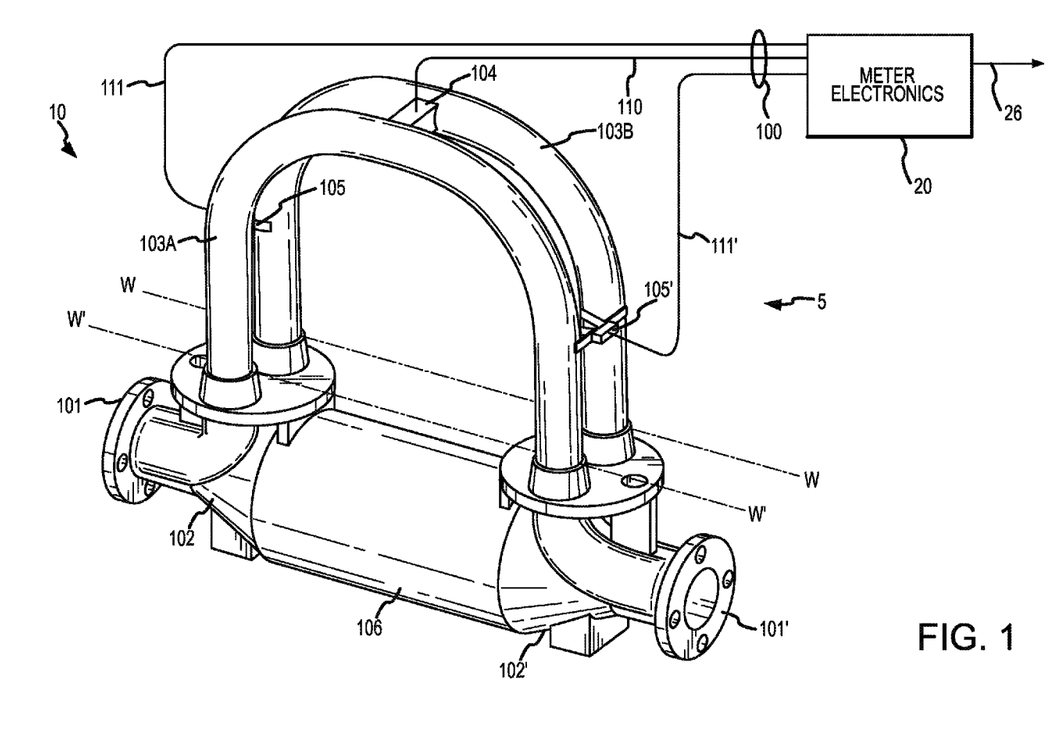
FIG. 1 shows a vibrating meter according to an embodiment.

FIG. 1 shows a vibrating meter 5 in the form of a Coriolis flow meter comprising a sensor assembly 10 and a meter electronics 20 according to an embodiment. The sensor assembly 10 and the meter electronics 20 can be in electrical communication via leads 100. The sensor assembly 10 receives a flowing fluid in the embodiment shown; however, sensor assemblies of vibrating meters are not necessarily limited to a structure where a fluid under test is flowing. Therefore, the sensor assembly 10 may comprise the vibrating portion of a vibrating densitometer where the fluid is not flowing, the sensing portion of ultra-sonic flow meters, the sensing portion of magnetic volumetric flow meters, etc.

In the embodiment shown, the meter electronics 20 is connected to the sensor assembly 10 to measure one or more characteristics of a flowing material, such as, for example, density, mass flow rate, volume flow rate, totalized mass flow, temperature, and other information. While the meter electronics 20 is shown in communication with a single sensor assembly 10, it should be appreciated that the meter electronics 20 may communicate with multiple sensor assemblies, as well as multiple additional meter electronics 20. Further, it should be appreciated that while the vibrating meter 5 is described as comprising a Coriolis flow meter, the vibrating meter 5 could just as easily comprise another type of vibrating meter, such as a vibrating densitometer, a vibrating volumetric flow meter, or some other vibrating meter that lacks all of the measurement capabilities of Coriolis flow meters. Therefore, the present embodiment should not be limited to Coriolis flow meters. Rather, the meter electronics 20 may be in communication with other types of sensor assemblies, with a flowing fluid or a stationary fluid.

The sensor assembly 10 includes a pair of flanges 101 and 101', manifolds 102 and 102', and conduits 103A and 103B. Manifolds 102, 102' are affixed to opposing ends of the conduits 103A and 103B. Flanges 101 and 101' of the Coriolis flow meter are affixed to opposite ends of the spacer 106. The spacer 106 maintains the spacing between manifolds 102, 102' to prevent undesired vibrations in the conduits 103A and 103B. The conduits 103A and 103B extend outwardly from the manifolds in an essentially parallel fashion. When the sensor 10 is inserted into a pipeline system (not shown) which carries the flowing material, the material enters sensor assembly 10 through the flange 101, passes through the inlet manifold 102 where the total amount of material is directed to enter conduits 103A, 103B, flows through the conduits 103A, 103B and back into the outlet manifold 102' where it exits the sensor assembly 10 through the flange 101'.

The sensor assembly 10 can include a driver 104. The driver 104 is shown affixed to conduits 103A, 103B in a position where the driver 104 can vibrate the conduits 103A, 103B in the drive mode, for example. The driver 104 may comprise one of many well-known arrangements such as a coil mounted to the conduit 103A and an opposing magnet mounted on the conduit 103B. A drive signal in the form of an alternating current can be provided by the meter electronics 20, such as for example via pathway 110, and passed through the coil to cause both conduits 103A, 103B to oscillate about bending axes W-W and W'-W'.

The sensor assembly 10 also includes a pair of pick-off sensors 105, 105' that are affixed to the conduits 103A, 103B. According to an embodiment, the pick-offs 105, 105' may be electromagnetic detectors, for example, pick-off magnets and pick-off coils that produce pick-off signals that represent the velocity and position of the conduits 103A, 103B. For example, the pick-offs 105, 105' may supply pick-off signals to the meter electronics 20 via pathways 111, 111'. Those of ordinary skill in the art will appreciate that the motion of the conduits 103A, 103B is proportional to certain characteristics of the flowing material, for example, the mass flow rate and the density of the material flowing through the conduits 103A, 103B.

According to an embodiment, the meter electronics 20 receives the pick-off signals from the pick-offs 105, 105'. A path 26 can provide an input and an output means that allows one or more meter electronics 20 to interface with an operator. The meter electronics 20 can measure one or more characteristics of the fluid under test such as, for example, a phase difference, a frequency, a time delay (phase difference divided by frequency), a density, a mass flow rate, a volume flow rate, a totalized mass flow, a temperature, a meter verification, and other information.

Figure 2:
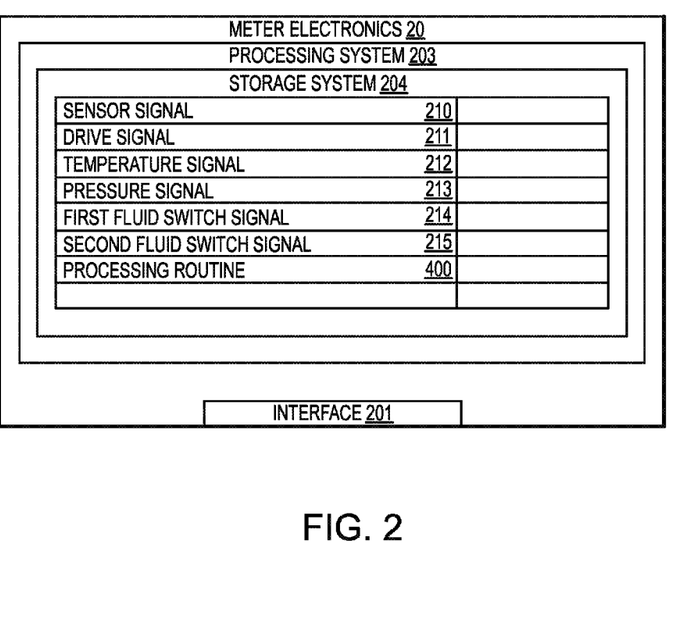
FIG. 2 shows a meter electronics according to an embodiment.

FIG. 2 shows the meter electronics 20 outlined in FIG. 1 according to an embodiment. The meter electronics 20 can include an interface 201 and a processing system 203. The processing system 203 may include a storage system 204. The storage system 204 may comprise an internal memory as shown, or alternatively, may comprise an external memory. The meter electronics 20 can generate a drive signal 211 and supply the drive signal 211 to the driver 104 shown in FIG. 1. The meter electronics 20 can also receive sensor signals 210 from the sensor assembly 10, such as from pick-off sensors 105, 105' via leads 111 and 111' shown in FIG. 1. In some embodiments, the sensor signals 210 may be received from the driver 104. The meter electronics 20 can operate as a densitometer or can operate as a flow meter, including operating as a Coriolis flow meter. It should be appreciated that the meter electronics 20 may also operate as some other type of vibrating meter assembly and the particular examples provided should not limit the scope of the present embodiment. The meter electronics 20 can process the sensor signals 210 in order to obtain one or more flow characteristics of the material flowing through the conduits 103A, 103B.

The interface 201 can receive the sensor signals 210 from the driver 104 or the pick-off sensors 105, 105', via leads 110, 111, 111'. The interface 201 may perform any necessary or desired signal conditioning, such as any manner of formatting, amplification, buffering, etc. Alternatively, some or all of the signal conditioning can be performed in the processing system 203. In addition, the interface 201 can enable communications between the meter electronics 20 and external devices. The interface 201 can be capable of any manner of electronics, optical, or wireless communication.

The interface 201 in one embodiment, can include a digitizer (not shown), wherein the sensor signals 210 comprise analog sensor signals. The digitizer can sample and digitize the analog sensor signals and produce digital sensor signals. The digitizer can also perform any needed decimation, wherein the digital sensor signal is decimated in order to reduce the amount of signal processing needed and to reduce the processing time.

The processing system 203 can conduct operations of the meter electronics 20 and process flow measurements from the sensor 10. The processing system 203 can execute the data processing required to implement one or more processing routines, as well as process the flow measurements in order to produce one or more flow characteristics.

The processing system 203 can comprise a general-purpose computer, a micro-processing system, a logic circuit, or some other general purpose or customized processing device. The processing system 203 can be distributed among multiple processing devices. The processing system 203 can include any manner of integral or independent electronic storage medium, such as the storage system 204.

It should be understood that the meter electronics 20 may include various other components and functions that are generally known in the art. These additional features are omitted from the description and figures for the purpose of brevity. Therefore, the present embodiment should not be limited to the specific embodiments shown and discussed.

Figure 3:
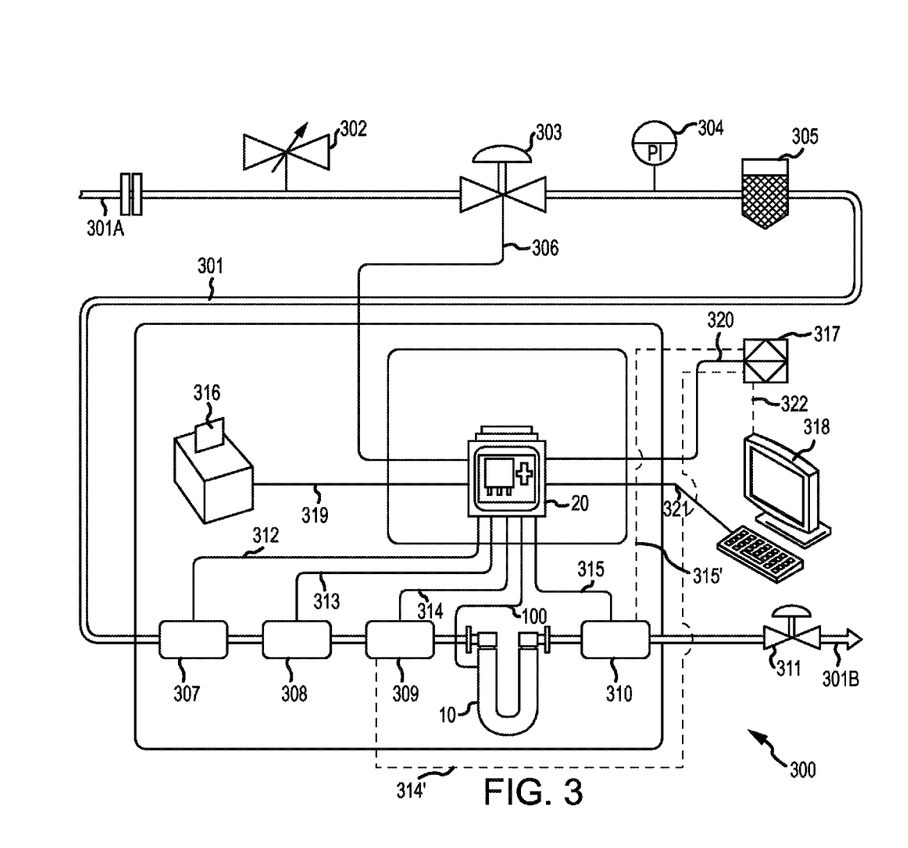
FIG. 3 shows a fluid flow system according to an embodiment.

FIG. 3 shows a fluid flow system 300 according to an embodiment. According to an embodiment, the fluid flow system 300 may be configured to transfer a fluid from a first entity to a second entity, i.e., custody transfer. For example, the fluid flow system 300 may comprise a bunkering delivery system that transfers bunker fuel from a barge (first entity) to a ship (second entity). As can be appreciated, in such a situation, it is desirable to determine the precise amount of fuel that is transferred as well as possibly the quality, grade, purity, etc. It is also desirable that the measurement is automated and free from human intervention. According to another embodiment, the fluid flow system 300 may comprise a fluid delivery system for a batch process in a manufacturing facility. The fluid flow system 300 may be incorporated into an existing pipeline 301, for example. It should be appreciated that the fluid flow system 300 may be utilized in a wide variety of applications and therefore, the particular site the fluid flow system 300 is implemented into should in no way limit the scope of the present embodiment. Furthermore, while various components are described in FIG. 3, the present embodiment should not be limited in requiring all of the components shown, but rather, the scope of the embodiment should be limited only by the claims that follow as some of the components illustrated are optional.

According to an embodiment, the fluid flow system 300 comprises a pipeline 301. The pipeline 301 may comprise a preexisting pipeline that is part of a larger system. The pipeline 301 comprises a fluid inlet 301A and a fluid outlet 301B. The fluid flow system 300 may further include a sampling valve 302, a flow control valve 303, a pressure sensor 304, and a filter 305. The sampling valve 302 may be provided to obtain periodic samples of the fluid flowing through the pipeline 301, for example. According to an embodiment, the flow control valve 303 may be in electrical communication with the meter electronics 20 via lead 306. The fluid flow system 300 can further comprise a temperature sensor 307, a pressure transmitter 308, a first fluid switch 309, the sensor assembly 10, a second fluid switch 310, and a shut-off valve 311, all of which are in fluid communication with one another via the pipeline 301 as shown in the figure. As shown in FIG. 3, the temperature sensor 307, the pressure transmitter 308, the first and second fluid switches 309, 310, and the sensor assembly 10 can be in electrical communication with the meter electronics 20 via leads 312, 313, 314, 315, and 100, respectively. It should be appreciated however, that in other embodiments, the various sensors and switches may be in electrical communication via a wireless interface.

In addition to the various sensors in electrical communication with the meter electronics 20, the meter electronics 20 can also be in electrical communication with a ticket printer 316, a system controller 317, and a user interface 318 via leads 319, 320, and 321, respectively. Furthermore, while the first and second fluid switches 309, 310 are shown in electrical communication with the meter electronics 20 of the vibrating meter 5, in an alternative embodiment, the first and second fluid switches 309, 310 may be in electrical communication with the system controller 317 instead as shown by dashed lines 314', 315'. The system controller 317 therefore, may comprise a centralized processing system, a general-purpose computer, or some other type of general or customized processing device that can process signals received from both the fluid switches 309, 310 as well as signals from a meter electronics 20 of the vibrating meter 5. Therefore, the system controller 317 may not comprise a portion of the vibrating meter 5, but rather, be configured to process signals from the vibrating meter 5. The system controller 317 can also be in electrical communication with the user interface 318 via lead 322. This may allow a user to configure the system controller 317 according to the user's preference or requirements.

In use, the fluid control valve 303 can be opened to allow fluid to flow from the fluid inlet 301A to the fluid outlet 301B. The fluid control valve 303 may be manually opened or electronically opened using the meter electronics 20, for example. A pump (not shown) may be used to cause the fluid to flow through the pipeline 301, for example. The fluid may comprise a bunker fuel, for example, or some other type of fluid. The fluid may comprise a liquid, a liquid entrained with gas, a liquid including solid particulates, etc. Therefore, the particular fluid flowing through the fluid flow system 300 should in no way limit the scope of the presently described embodiment.

As the fluid is flowing through the system 300, the fluid flows through the sampling valve 302, the fluid control valve 303, the pressure sensor 304, and the filter 305. These components may comprise a portion of the first entity's equipment. For example, these components may comprise a portion of the seller's equipment in a bunkering application. However, in other embodiments, all of the components shown may comprise a portion of a single entity's equipment.

The fluid eventually flows through the sensor assembly 10 of the vibrating meter 5. The sensor assembly 10 can provide sensor signals 210 to the meter electronics 20 over leads 100, which can measure one or more flow characteristics, such as the fluid density, the mass flow rate, a volume flow rate, totalized mass flow, and totalized volume flow based on sensor signals 210. In some situations, the fluid flow system 300 may be utilized as a batch type system wherein the totalized values for mass flow and/or volume flow are desired. However, it should be appreciated that the fluid flow system 300 does not have to be implemented as a batch type system. In embodiments where the fluid flow system 300 does comprise a batch type system, the meter electronics 20 can begin totalizing the flow through the sensor assembly 10 once the fluid control valve 303 is opened. In addition to measuring flow characteristics through the sensor assembly 10, the meter electronics 20 can receive a temperature signal 212 from the temperature sensor 307 and a pressure signal 213 from the pressure transmitter 308.

According to an embodiment, the meter electronics 20 can further receive a first fluid switch signal 214 from the first fluid switch 309. According to the embodiment shown, the first fluid switch 309 is proximate to and upstream from the sensor assembly 10 of the vibrating meter 5. Therefore, the first fluid switch signal 214 can comprise a signal indicating one or more flow conditions upstream of the sensor assembly 10.

The first fluid switch signal 214 can indicate one or more fluid conditions have fallen outside a threshold level such as a signal indicating a fluid level and/or a fluid flow rate are outside a threshold value or a threshold band (range of values). The threshold values may comprise a low fluid level threshold or a low flow rate level, for example. However, the particular threshold level may depend upon the particular type of fluid switch implemented. According to an embodiment, the first fluid switch 309 can comprise a liquid level switch, such as the Rosemount® 2120 Liquid Level Switch. According to an embodiment, the first fluid switch 309 may not provide the first fluid switch signal 214 until the one or more fluid conditions have fallen outside the threshold value for a predetermined amount of time. This allows for some variation in the flow without affecting the measured flow characteristics output by the meter electronics 20. However, other types of liquid level switches can be used. In embodiments where the first fluid switch 309 comprises a liquid level switch, the first fluid switch signal 214 sent to the meter electronics 20 can indicate if the fluid level within the pipeline 301 is above or below a predetermined level. For example, in one embodiment, the fluid switch 309 may be positioned within the pipeline 301 such that the switch 309 can detect if the fluid level within the pipeline 301 falls below approximately ¼ of the cross-sectional area of the pipeline 301, i.e., the pipeline 301 is only ¼ full. This may be accomplished by inserting the switch ¾ of the way down the cross-section of the pipeline 301. The particular levels are merely examples and should in no way limit the scope of the present embodiment. The fluid level within the pipeline 301 may fall below the predetermined level, if the flow control valve 303 is closed and the fluid within the pipeline 301 begins to empty as the pipeline 301 is being drained, for example. The fluid level within the pipeline 301 may also fall below the predetermined level at the end of a batch, for example and the remaining fluid within the pipeline 301 is drained.

According to an embodiment, the first fluid switch 309 is located proximate to and in fluid communication with the sensor assembly 10, such that the flow through the sensor assembly 10 reduces to approximately zero as the fluid level at the first fluid switch 309 drops below the predetermined threshold. Therefore, according to an embodiment, if the fluid within the pipeline 301 falls below the predetermined level as detected by the first fluid switch 309, the meter electronics 20 may receive the first fluid switch signal 214 and determine that flow through the sensor assembly 10 has decreased below a threshold level, i.e., zero. Thus, the meter electronics 20 may stop totalizing false flow measurements that may be detected by the sensor assembly 10. However, the sensor assembly 10 may still have fluid within the flow conduits 103A, 103B.

According to another embodiment, rather than comprising a fluid level switch, the first fluid switch 309 may comprise a fluid flow switch, such as a thermal flow switch or a paddle-type flow switch, as is generally known in the art. In this embodiment, the fluid condition signaled by the first fluid switch signal 214 can indicate whether the fluid flow rate through the pipeline 301 has fallen outside a threshold value or band. Preferably, the first fluid switch 309 would be located proximate to and in fluid communication with the sensor assembly 10 such that if the first fluid switch 309 determines the flow rate is less than the threshold level, the flow rate through the sensor assembly 10 would also be less than the threshold level.

Although a fluid flow switch may be used in any desired environment, including bunkering, in some situations it may be more desirable to use a fluid level switch rather than a fluid flow switch. This may be particularly true in situations where there is a concern that, due to fluid viscosity for example, a fluid flow switch could be inadvertently stuck open even after the flow falls below the threshold level. Consequently, some situations may be better suited with a fluid level switch comprising the fluid switch 309.

According to an embodiment, if the first fluid switch 309 determines that the fluid level or the fluid flow rate within the pipeline 301 proximate the sensor assembly 10 is within the predetermined threshold level, the meter electronics 20 can continue measuring flow characteristics, such as totalizing the flow rate through the sensor assembly 10. For example, the first fluid switch 309 may determine that the fluid level is above a threshold fluid level or that the fluid flow rate exceeds a threshold fluid flow rate. Conversely, if the first fluid switch 309 determines that the fluid level or the fluid flow rate within the pipeline 301 proximate the sensor assembly 10 falls outside the predetermined threshold value or band, the first fluid switch 309 can signal the meter electronics 20 to correct the flow rate through the sensor assembly 10. The correction may be to stop totalizing and/or stop measuring the flow rate, for example. As explained above, the meter electronics 20 may stop totalizing the flow rate through the sensor assembly 10 even if the sensor assembly 10 detects a time delay that is different from the previously determined zero offset, i.e., the sensor assembly 10 detects fluid flow.

As shown in the embodiment of FIG. 3, the fluid flow system 300 may further comprise a second fluid switch 310. The second fluid switch 310 may be located downstream of the sensor assembly 10, for example. In a similar manner to the first fluid switch 309, the second fluid switch 310 can provide a second fluid switch signal 215 to the meter electronics 20. The second fluid switch signal 215 can indicate whether the fluid level or the fluid flow rate within the pipeline 301 proximate to and downstream of the sensor assembly 10 has fallen outside a predetermined threshold value or band. According to an embodiment, the first and second fluid switches 309, 310 may be in communication with the meter electronics 20 in parallel so as to create the equivalent of an "OR" gate. Consequently, as explained below, the meter electronics 20 can correct the measured flow rate if either of the switches 309, 310 provide a signal to the meter electronics 20.

When the flow control valve 303 is opened, fluid should flow through the pipeline 301 and the predetermined levels of the first and second fluid switches 309, 310 should be exceeded. Therefore, the first and second fluid switch signals 214, 215 will allow the meter electronics 20 to continue measuring and/or totalizing the flow characteristics of the fluid.

However, upon closing the flow control valve 303, the shut off valve 311, or both, the fluid flow rate through the fluid flow system 300 will drop to approximately zero. In some embodiments, the pipeline 301 may be configured such that the remaining fluid within the pipeline 301 drains in order to empty the pipeline. As the fluid flow rate and/or the fluid level within the pipeline 301 falls below the predetermined threshold levels, the first and/or second fluid switches 309, 310 will send a signal to the meter electronics 20 indicating that one or more fluid conditions are outside predetermined value or band. With the meter electronics 20 receiving a first and/or a second fluid switch signal 214, 215, the meter electronics 20 can correct the measured flow characteristics of the fluid within the sensor assembly 10 even if the sensor signals 210 sent by the sensor assembly 10 indicate fluid is still flowing through the sensor assembly 10. Therefore, even if entrained gas within the fluid or a partially filled conduit causes asymmetric damping of the sensor assembly 10, thereby resulting in a change in the zero offset of the sensor assembly 10, the meter electronics 20 will stop totalizing the false flow rate.

As mentioned above, the correction may stop measuring the flow characteristics of the fluid within the sensor assembly 10. Alternatively, the correction may stop totalizing the flow characteristics already received. Another alternative may be to correct the flow characteristics to a value obtained prior to receiving the fluid switch signal 214. For example, upon receiving a fluid switch signal 214 indicating one or more fluid conditions are outside predetermined values or bands, the measured density may be corrected back to a density obtained at some time prior to receiving the fluid switch signal 214 or some other known or stored density. Those skilled in the art will readily appreciate that other corrections to the flow characteristics may be made while remaining within the scope of the presently described embodiment.

Once the meter electronics 20 stops totalizing the flow rate, the ticket printer 316 may print a ticket with the totalized flow rate along with any other desired flow characteristics that are determined by the vibrating meter 5. Furthermore, the host computer 317 may send a signal to the meter electronics 20 to perform some other measurement or alternatively perform a reset in preparation for a subsequent measurement cycle. The user interface 318 may also allow a user to monitor the status of the meter electronics 20 during and after the measurement cycle, for example.

According to an alternative embodiment, the first and second fluid switches 309, 310 can be in direct electrical communication with the system controller 317 instead of the meter electronics 20. According to this alternative embodiment, the meter electronics 20 can receive the sensor signals 210 from the sensor assembly 10 and generate one or more flow characteristics. The one or more flow characteristics can be provided to the system controller 317 for further processing, for example. The system controller 317 can also receive the first and second fluid switch signals 214, 215 via leads 314', 315'. In a similar manner as described above, if the system controller 317 receives a first or second fluid switch signal 214, 215 indicating that one or more fluid conditions are outside the threshold value or band, the system controller 317 can correct the flow characteristics incoming from the meter electronics 20. The correction may attribute the incoming signals to zero flow, i.e., determine the flow characteristics are false.

Providing the first and second fluid switch signals 214, 215 to the system controller 317 rather than to the meter electronics 20 may be advantageous in situations where the vibrating meter 5 is already implemented and the meter electronics 20 is already configured. Therefore, rather than reconfiguring the meter electronics 20 of the vibrating meter 5, the system controller 317 can be reconfigured to process the first and second fluid switch signals 214, 215.

Figure 4:
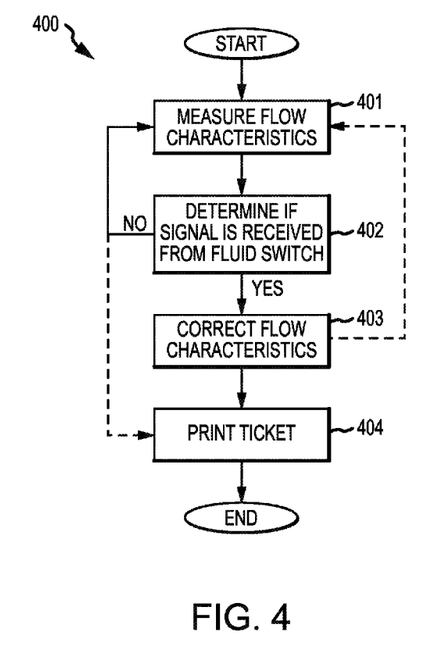
FIG. 4 shows a processing routine according to an embodiment.

FIG. 4 shows a processing routine 400 according to an embodiment. The processing routine 400 may be performed by the meter electronics 20, for example. The processing routine 400 may be used to prevent false totalizing of measurements by the vibrating meter 5 after flow through the sensor assembly 10 has ceased during a batch process, for example. The processing routine 400 may be stored in the storage system 204, for example.

Processing routine 400 starts in step 401 where the vibrating meter 5 measures one or more fluid flow characteristics such as a phase difference, a frequency, a time delay, a density, a mass flow rate, a volume flow rate, a totalized mass flow, etc. based on received sensor signals 210 as is generally known in the art.

In step 402, the meter electronics 20 determines if a signal has been received from the first or the second fluid switch 309, 310. As explained above, the first and second fluid switches 309, 310 determine if one or more fluid conditions have fallen outside a threshold value or band. For example, the first or second fluid switches 309, 310 may determine if the fluid level has dropped below a threshold fluid level. Alternatively, the switches 309, 310 may determine if the flow rate has dropped below a threshold flow rate. In some embodiments, the first fluid switch 309 may determine if a fluid level within the pipeline 301 has fallen outside the threshold value while the second fluid switch 310 may determine if a flow rate within the pipeline 301 has fallen outside the threshold value. In other words, the first fluid switch 309 may comprise a fluid level switch while the second fluid switch 310 may comprise a fluid flow switch.

If the meter electronics 20 has received a fluid switch signal 214, 215 from either the first or the second fluid switch 309, 310, the processing routine 400 proceeds to step 403 where the meter electronics 20 corrects the flow characteristics. The meter electronics 20 may stop measuring flow characteristics even if the sensor assembly 10 indicates a time delay different from the zero offset. As explained above, this indicated "measured" flow rate may be due to entrained gas within the fluid, partially filled flow conduits 103A, 103B, or some other condition that has changed the zero offset of the sensor assembly 10. After step 403, the processing routine 400 may proceed to an optional step 404 where a ticket is printed by ticket printer 316 indicating the totalized values measured by the vibrating meter 5. Alternatively, the processing routine 400 may return to step 401 to measure further flow characteristics.

Alternatively, if the meter electronics 20 has not received a signal from either fluid switch 309, 310, the processing routine 400 returns to step 401 where further flow characteristics are measured or the process ends and a ticket can be printed.

The embodiments described above disclose a system and method for preventing false totalizing of measurements from a vibrating meter 5. The system and method can restrict the meter electronics 20 from either measuring or totalizing measurements if a fluid switch signal 214, 215 is received from either a first or a second fluid switch 309, 310. The first and second fluid switches 309, 310 therefore, signal the meter electronics 20 if a fluid condition has fallen outside a threshold value or band. For example, the first and second fluid switches 309, 310 can signal the meter electronics 20 to correct one or more flow characteristics, such as to stop measuring and/or totalizing flow characteristics of the fluid within the system 300 if the fluid level within the pipeline 301 has fallen below a threshold value. In another embodiment, the first and second fluid switches 309, 310 can signal the meter electronics 20 to stop measuring and/or totalizing flow characteristics of the fluid within the system 300 if the fluid flow rate through the pipeline 301 has fallen outside a threshold value or band. In either situation, the fluid switches 309, 310 can signal a condition that exists when the actual flow rate through the sensor assembly 10 has dropped to zero, or at least to below a threshold value. Consequently, the system 300 can reduce the chance of false measurements that may be due to an imbalance in the sensor assembly 10 caused by entrained gas or partially filled flow conduits, for example.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments of, and examples for, the prevention system are described herein for illustrative purposes, various equivalent modifications are possible within the scope of the present description, as those skilled in the relevant art will recognize. The teachings provided herein can be applied to other vibrating meter systems, and not just to the embodiments described above and shown in the accompanying figures. Accordingly, the scope of the embodiments should be determined from the following claims.

We claim:

1. A fluid flow system (300), comprising:
   a pipeline (301);
   at least one fluid switch located within the pipeline (301) and determining one of one or more fluid conditions within the pipeline (301), wherein a first fluid switch (309) of the at least one fluid switch comprises a fluid level switch wherein a first fluid switch signal (214) indicates that a liquid fill level within the pipeline (301) is outside a threshold value or band;
   a vibrating meter (5) including:
   a sensor assembly (10) located within the pipeline (301) proximate to and in fluid communication with the first fluid switch (309); and a meter electronics (20) in electrical communication with the sensor assembly (10) to receive one or more sensor signals (210) and measure one or more flow characteristics, wherein a flow characteristic of the one or more flow characteristics comprises a mass flow rate;

a system controller (317) in electrical communication with the first fluid switch (309) and in electrical communication with the meter electronics (20) and configured to:

receive the one or more measured flow characteristics from the meter electronics (20);

receive the first fluid switch signal (214) indicating one of the one or more fluid conditions within the pipeline (301) from the first fluid switch (309); and correct at least one of the one or more flow characteristics measured by the meter electronics if a fluid condition of the one or more fluid conditions is outside a threshold value or band.

2. The fluid flow system (300) of claim 1, wherein the first fluid switch (309) is located upstream from the sensor assembly (10).

3. The fluid flow system (300) of claim 2, further comprising at least a second fluid switch (310) located proximate to and downstream from the sensor assembly (10).

4. The fluid flow system (300) of claim 1, wherein the at least one fluid switch comprises a fluid flow switch that indicates that a fluid flow rate through the pipeline (301) is outside a threshold value or band.

5. The fluid flow system (300) of claim 1, wherein the correction of the measured flow characteristics comprises determining the measured flow characteristics are false.

6. A method for operating a vibrating meter including a meter electronics and a sensor assembly located within a pipeline and in fluid communication with one or more fluid switches, comprising steps of:

measuring one or more flow characteristics of a fluid flowing through the sensor assembly;

measuring one or more fluid conditions with the one or more fluid switches wherein a fluid switch of the one or more fluid switches comprises a fluid level switch, wherein the fluid level switch is configured to determine a liquid fill level within the pipeline; and correcting the one or more flow characteristics of the fluid flowing through the sensor assembly if the liquid fill level is outside a threshold value or band.

7. The method of claim 6, comprising measuring a flow rate within the pipeline.

8. The method of claim 6, wherein the step of correcting comprises determining the flow characteristics are false.

9. The method of claim 8, further comprising a step of totalizing the one or more flow characteristics after a fluid condition of the one or more fluid conditions falls outside the threshold value or band.

10. The method of claim 6, wherein the vibrating meter comprises a Coriolis flow meter.

11. The method of claim 10, wherein a flow characteristic of the one or more flow characteristics comprises a mass flow rate.

12. A meter electronics (20) for a vibrating meter (5) with a sensor assembly located within a pipeline (301) and in fluid communication with one or more fluid switches (309), the meter electronics (20) configured to:

measure one or more flow characteristics of a fluid flowing through the sensor assembly (10);

receive a first fluid switch signal (214) indicating a fluid condition within the pipeline (301) from a first fluid switch (309) of the one or more fluid switches; and correct the one or more flow characteristics if the fluid condition is outside a threshold value or band, wherein the fluid condition comprises a liquid fill level within the pipeline.

13. The meter electronics (20) of claim 12, wherein the one or more flow characteristics of the one or more flow characteristics comprises a flow rate within the pipeline.

14. The meter electronics (20) of claim 12, wherein the correction of the measured flow characteristics comprises determining the flow characteristics are false.

15. The meter electronics (20) of claim 14, further configured to totalize the one or more flow characteristics after the fluid condition falls outside the threshold value or band.

16. The meter electronics (20) of claim 12, wherein the first fluid switch (309) is located upstream of the sensor assembly (10) and wherein the meter electronics (20) is further configured to receive a second fluid switch signal (215) from a second fluid switch (310) located downstream of the sensor assembly (10).

* * * * *

UNITED STATES PATENT AND TRADEMARK OFFICE
CERTIFICATE OF CORRECTION

PATENT NO. : 9,851,239 B2  
APPLICATION NO. : 14/116472  
DATED : December 26, 2017  
INVENTOR(S) : Joel Weinstein et al.

It is certified that error appears in the above-identified patent and that said Letters Patent is hereby corrected as shown below:

In the Specification

Column 1, Line 9, replace "No," with --No.--

Column 1, Line 11, replace "flied" with --filed--

Signed and Sealed this  
Twenty-sixth Day of June, 2018

Andrei Iancu  
*Director of the United States Patent and Trademark Office*